United States Patent [19]
Leach

[11] 3,711,170
[45] Jan. 16, 1973

[54] HUB ASSEMBLY

[76] Inventor: Raymond B. Leach, 222 South 88th Street, Omaha, Nebr. 68114

[22] Filed: May 21, 1971

[21] Appl. No.: 145,825

[52] U.S. Cl. ................................................308/184
[51] Int. Cl. ..............................................F16c 27/00
[58] Field of Search......................................308/184

[56] References Cited

FOREIGN PATENTS OR APPLICATIONS 47,127   0/0000   Sweden...............................308/184

*Primary Examiner*—Milton Kaufman
*Assistant Examiner*—Frank Susko
*Attorney*—Clarence A. O'Brien and Harvey B. Jacobson

[57] ABSTRACT

A hub assembly connecting a rotatable member to a support member, such as an axle, shaft, or the like, incorporating a resiliently suspended, laterally movable slide member enabling relative lateral movement between the rotatable member and the support thereof with such movement being cushioned and resisted by the resiliently suspended slide member. The hub assembly and particularly the resiliently biased suspension employs the use of exotic materials not previously employed in a suspension system or action of this type. In generic terms, the exotic materials include nonmetallic materials such as plastics of various types but also steel and aluminum which has been surface treated for hardening.

6 Claims, 6 Drawing Figures

PATENTED JAN 16 1973

3,711,170

Raymond B. Leach
INVENTOR.

BY *Clarence A. O'Brien*
and *Harvey B. Jacobson*
Attorneys 3,711,170

HUB ASSEMBLY

The present invention generally relates to a hub assembly and more particularly a hub assembly forming a resiliently suspended rotatable connection between a rotatable member such as, but not limited to, an annular member or wheel and a supporting member including, but not limited to, a rod, shaft or axle for the wheel.

An object of the present invention is to provide a hub assembly adapted for use in various orientations relating to a resilient suspension of a relatively rotatable member and a relatively stationary member which enables resiliently resisted lateral movement of the components in relation to each other.

Another object of the invention is to provide a hub assembly incorporating a resilient suspension that includes a slide member guided laterally in a slot-like structure formed in an annular bearing race with a resilient suspension device interconnecting the slide member and race for resiliently cushioning and resisting relative movement between the slide member and bearing race in which the suspension member is constructed exotic materials.

A further object of the invention is to provide a hub assembly in accordance with the preceding objects in which the guiding relationship between the slide member and slot-like structure incorporated into the bearing race includes a novel bearing assembly carried by the slot-like structure of the bearing race and engaging the slide member for preventing binding of the slide member in relation to the bearing race.

Still another object of the invention is to provide a hub assembly in accordance with all of the preceding objects in which the rod member and bearing race are resiliently interconnected by one or more resilient, cushioning members of exotic materials such as a silicone, polyurethane, rubber or other resilient materials.

A further significant object of the invention is to provide a hub assembly which is effective and long lasting but yet is relatively simple in construction thereby rendering the device economically feasible.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
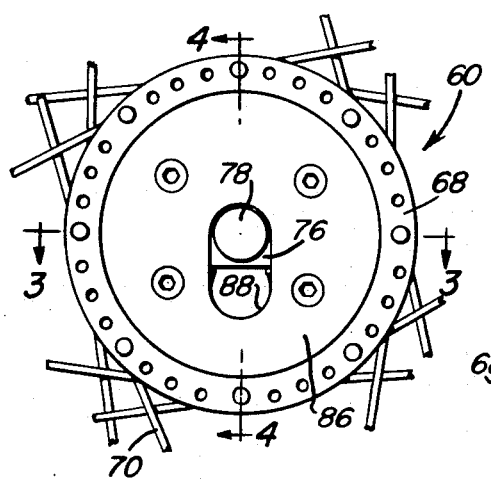
FIG. 1 is a side elevational view of an embodiment of the hub assembly.
Figure 2:
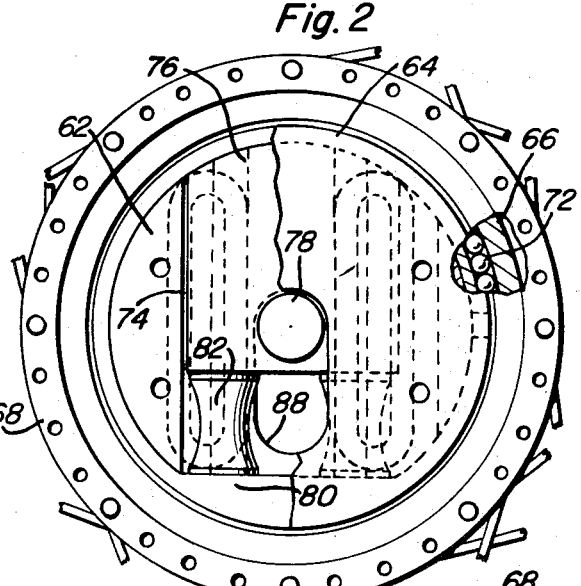
FIG. 2 is an elevational view with a cover plate removed illustrating the structure of the bearing race and slide member, together with the resilient suspension means for the slide member.
Figure 3:
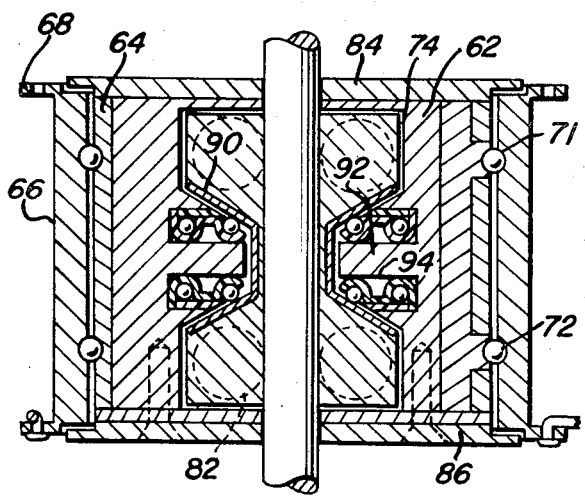
FIG. 3 is a transverse, sectional view taken substantially upon a plane passing along section line 3—3 of FIG. 1 illustrating further structural details of the bearing race and slide member together with the bearing assembly associated therewith.
Figure 4:
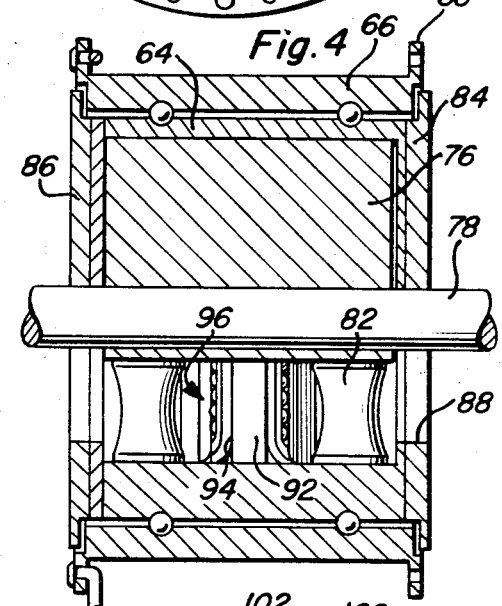
FIG. 4 is a sectional view taken along section line 4—4 of FIG. 1.

Referring now specifically to the drawing, the hub assembly illustrated is generally designated by reference numeral 60 and includes an inner member 62 having an inner bearing race 64 associated therewith and in registry with an outer bearing race 66 having flanges 68 attached thereto to which wire spokes 70 are connected in a conventional manner to form a wheel for use wherever a spoke wheel is desired. The inner race 64 is provided with a plurality of grooves 71 therein in registry with a corresponding plurality of grooves in the outer surface of the inner race 64 with ball bearings 72 being disposed in the grooves to provide relative rotation between the bearing races 64 and 66 and to provide a connection therebetween to prevent axial movement of the bearing races in relation to each other.

The inner member 62 includes a transverse slot 74 forming a guide for lateral movement of a slide member 76 which has an axle or shaft 78 extending therethrough and keyed thereto in a conventional manner so that the slot 74 provides a guide for lateral movement of the slide member 76 in relation to the inner member 62 and the inner bearing race 64. In this construction, the bottom of the slot 74 is provided with a bottom member 80 with a plurality of resilient members 82 interposed between the bottom of the slide member 76 and the bottom 80 of the slot 74, thus resiliently suspending the slide member in relation to the inner member 62. The number and spacing of the resilient members 82 may be varied depending upon the load requirements and the cushioning and resilient characteristics desired. End plates 84 and 86 are provided on the inner member 62 and bridge the junction between the races and are attached and detached in any suitable manner. The end plates 84 and 86 have slots 88 therein to accommodate movement of the axle 78 during movement of the slide member 76 in relation to the inner member 62.

The vertical central portion of each side of the slide member 78 is provided with a recess or notch 90 of generally V-shaped configuration with the bottom of the V being relatively flat which receives a correspondingly shaped projection 92 in the side walls of the slot 74, thus guiding the transverse movement of the slide member 76. The projection 92 on the side walls of the slot 62 are each provided with a pair of vertical recesses 94 receiving ball bearing assemblies generally designated by the numeral 96.

Figure 5:
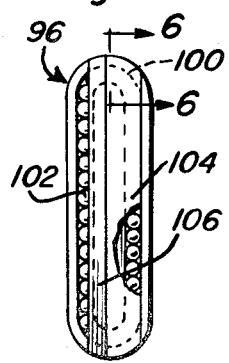
FIG. 5 is an elevational view of a bearing assembly used between the slide member and guide slot.
Figure 6:
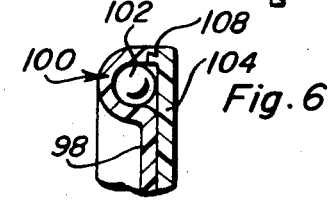
FIG. 6 is a fragmental sectional view taken along section line 6—6 of FIG. 5.

As illustrated in FIGS. 5 and 6, the bearing assembly 96 includes a generally oval shaped plate 98 having a peripheral recess 100 formed therein receiving a plurality of ball bearings 102 which can circulate in the peripheral recess. A closure plate 104 closes the front of the peripheral recess 100 except for one elongated portion thereof which exposes a plurality of the ball bearings for engagement with the corresponding incline surface 90 on the slide member 76. As illustrated, the edge of the closure plate 104 where it exposes the ball bearings 102 is beveled or inclined as at 106 thereby assuring exposure of a portion of the periphery of the ball bearings for providing rolling engagement with the inclined surface 90 thereby preventing binding of the slide member during reciprocation. The plate 98 and the plate 100 are preferably constructed of plastic or other similar material and are snapped together with a suitable snap fastener along a peripheral line 108. Thus, the slide member 76 is not only guided by the projection 92 on the opposed inner wall of the slot 74 but the bearing assemblies captively received in the recesses provide for reduced friction and elimination of binding between the relatively movable slide member 76 and inner member 62.

While the device has been illustrated in a wheel structure, it is also useful in association with caster wheels and in conveyor belt pulleys, drive belt pulleys, chain drive sproket gears, or the like, in which it may be employed to maintain the flexible belt or chain engaged therewith in a taut condition. In all such installations, the use of materials such as disclosed in U.S. Pat. No. 2,855,377 for the bearing races and silicones, polyurethane or the like as the resilient material results in elimination of the necessity of lubricating the components which is a significant advantage and the use of the exotic materials renders the device substantially free of corrosion or other detrimental effects that might occur when the device is operated or it might be in contact with water, sand, or the like.

The foregoing is considered as illustrative only of the principles of the invention. Further, since numerous modifications and changes will readily occur to those skilled in the art, it is not desired to limit the invention to the axact construction and operation shown and described, and accordingly all suitable modifications and equivalents may be resolted to, falling within the scope of the invention.

What is claimed as new is as follows:

1. A hub assembly comprising an inner and outer bearing race, at least one race being constructed of a self-lubricating material, each bearing race having at least one peripheral groove therein, said grooves being in registry with each other, and a plurality of ball bearings received partially in each of the registered grooves thereby rotatably supporting the bearing races in relation to each other and preventing axial movement therebetween, said inner bearing race including transverse guide means, a slide member movably guided by said guide means, and resilient means retaining said slide member biased to a predetermined position, said transverse guide means being in the form of a slot, said slide member being movably disposed in said slot, said resilient means being disposed between the slide member and one end of the slot, said transverse slot and slide member including interengaging recesses and ribs guiding the transverse movement of the slide member in relation to the slot, said recesses receiving the ribs including longitudinal slots therein, and bearing means received in said longitudinal slots engaging the ribs for preventing binding during relative movement between the slide member and transverse guide means.

2. The structure as defined in claim 1, wherein said inner bearing race is provided with an aperture communicating with the groove therein, a closure plug for said aperture including an inner end corresponding in shape to the groove, said transverse guide means engaging the closure plug and retaining it in position when assembled in the inner race.

3. The structure as defined in claim 1, wherein the bearing means received in the slots each comprise a plate having a continuous groove therein defining a race, a plurality of ball bearings disposed in said race, and retaining means partially overlying the groove and ball bearings for retaining the ball bearings in the groove while exposing a portion of the ball bearings for engagement with the slide member.

4. The structure as defined in claim 3, wherein said plate and groove are elongated oval-shaped with one side of the groove being partially exposed.

5. A hub assembly for support on an axle and for supporting an annular member for rotation and relative transverse movement in relation to the axle comprising a hub member including an inner annular bearing member and an outer annular bearing member rotatably supported on the inner annular bearing member, said inner annular bearing member having a hollow interior, a guide means disposed in the hollow interior of the inner annular bearing member and including transversely extending guide surfaces, a slide member mounted on the guide means, resilient means interposed between the guide means and the slide member for biasing the slide member in one transverse direction in relation to the guide means, said slide member and guide means having corresponding, opposed inclined surfaces defining the path of movement of the slide member, bearing members engaged with at least one of the inclined surfaces to facilitate relative movement between the slide member and guide means, said guide means being removably disposed within the hollow interior of the inner annular bearing member, said inner annular bearing member having longitudinally spaced bearing races on the external surface thereof and a hole extending from the hollow interior to each of the bearing races, a plurality of bearing members disposed in each bearing race and engageable with the outer annular bearing member to facilitate relative rotation between the inner and outer annular bearing members, said holes enabling insertion of bearing members into the bearing races, closure means for said holes, said slide member retaining the closure means in the holes when the guide means is disposed within the hollow interior of the inner annular bearing member, said outer annular bearing member having longitudinally spaced bearing races therein corresponding with and in registry with the bearing races in the inner annular bearing member, said bearing member disposed in each race being in the form of balls received partially in each registered pair of races to prevent relative axial movement between the inner and outer annular bearing members.

6. The hub assembly as defined in claim 5 wherein said slide member is in the form of a block having substantially parallel opposed vertical surfaces, each of said vertical surfaces having a vertical recess therein defined by an inner surface parallel with the vertical surfaces and outwardly diverging side surfaces connected with the inner surface and the corresponding vertical surface, said guide means including substantially vertical, parallel opposed surfaces receiving the vertical surfaces on the block, each vertical surface on the guide means including a vertically disposed rib projecting into the recess in the slide block, said rib including outwardly converging surface areas corresponding with the outwardly diverging surfaces of the recess which receives the rib, each surface area on the rib including a longitudinal slot-like recess therein, and bearing means disposed in each slot-like recess in the rib for engagement with the corresponding outwardly diverging surfaces on the recess in the slide block to facilitate relative vertical movement therebetween.

* * * * *